United States Patent [19]

Van Horssen

[11] Patent Number: 4,724,618
[45] Date of Patent: Feb. 16, 1988

[54] THREAD GAUGE

[76] Inventor: Charles A. Van Horssen, 9233 N. 12 Ave., Phoenix, Ariz. 85021

[21] Appl. No.: 30,966

[22] Filed: Mar. 27, 1987

Related U.S. Application Data

[63] Continuation-in-part of Ser. No. 8,278, Jan. 28, 1987, Pat. No. 4,691,441.

[51] Int. Cl.⁴ .............................. G01B 3/48; G01B 5/16
[52] U.S. Cl. .................................................... 33/199 R
[58] Field of Search ...................................... 33/199 R

[56] References Cited

U.S. PATENT DOCUMENTS

| | | | |
|---|---|---|---|
| 2,536,225 | 1/1951 | Rice | 33/199 R |
| 2,602,347 | 7/1952 | Miller | 33/199 R |
| 2,662,300 | 12/1953 | Foster | 33/199 R |
| 3,064,355 | 11/1962 | Herman | 33/199 R |
| 4,519,144 | 5/1985 | Larsen | 33/199 R |
| 4,691,441 | 9/1987 | Van Horssen | 33/199 R |

FOREIGN PATENT DOCUMENTS

| | | | |
|---|---|---|---|
| 1536448 | 7/1968 | France | 33/199 R |
| 530891 | 12/1940 | United Kingdom | 33/199 |

Primary Examiner—Richard R. Stearns
Attorney, Agent, or Firm—Nissle & Leeds

[57] ABSTRACT

An improved thread measuring tool. The tool translates linear motion into rotational motion to provide the motive power for turning a thread gauge into a threaded bore in a workpiece.

1 Claim, 8 Drawing Figures

THREAD GAUGE

This is a continuation-in-part of my copending application Ser. No. 008,278 for "THREAD GAUGE", filed Jan. 28, 1987, and now Pat. No. 4,691,441.

This invention relates to a thread measuring tool.

More particularly, the invention relates to a thread measuring tool which translates linear motion into rotational motion to provide the motive power for turning a thread gauge into a threaded bore in a workpiece.

In a further respect, the invention relates to a thread measuring tool which includes an elongate three-dimensional neck having a contact surface that turns around the longitudinal axis of the neck and which includes a drive member slidably mounted on and conformed to the contact surface of the neck such that linear non-rotational movement of the drive member along the neck generates rotational forces acting on the contact surface of the neck.

Thread gauges of the type described and claimed in U.S. Pat. Nos. 4,519,144 to Larsen and 3,046,355 to Herman are well known. Such thread gauges have existed for a great many years and are utilized by grasping and rotating the gauge with the fingers of a hand to turn the calibrated threaded end of the gauge into a bore in a workpiece. When the threaded end of the gauge turns smoothly but snugly into the bore, then the threads in the bore have been correctly formed. While conventional thread gauges provide an accurate, simple way of testing the correctness of threads in a bore, manually turning a thread gauge into a bore and then unscrewing the gauge from the bore takes an appreciable amount of time, particularly when there are a great many workpieces to be tested.

Accordingly, it would be highly desirable to provide an improved thread gauge which would retain the advantage of simple construction found in manually rotated prior art gauges and which would significantly reduce the amount of time required to insert the threaded calibrated portion of the gauge in the internally threaded bore of a workpiece to test the correctness of threads in the bore.

These and other, further and more specific objects and advantages of the invention will be apparent to those skilled in the art from the following detailed description thereof, taken in conjunction with the drawings, in which.

Briefly, in accordance with my invention, I provide an improved thread measuring tool. The tool includes an elongate helical neck having a longitudinal axis and a first end and a second end; a threaded gauge attached to the first end of the neck; and, a drive member slidably mounted on the neck and having an inner helical surface slidably contacting the neck and shaped and dimensioned such that linear non-rotational displacement of the drive member along the neck in a direction of travel generally parallel the longitudinal axis generates forces on the helical neck causing the neck and threaded gauge to rotate.

In another embodiment of the invention I provide an improved method for turning the threads of a gauge over the threads of a workpiece to check the correctness of the workpiece threads. The method includes the steps of connecting the threaded gauge to an elongate helical neck having a longitudinal axis and a first end and a second end; slidably mounting a drive member on the helical neck, the drive member having an inner helical surface slidably contacting the neck and shaped and dimensioned such that linear non-rotational displacement of the drive member along the neck in a direction of travel generally parallel the longitudinal axis generates forces on the helical neck which cause the neck and threaded gauge to rotate; juxtaposing the thread gauge against the workpiece; and, displacing the drive member along the neck in a direction of travel generally parallel the longitudinal axis to rotate the threads of the gauge over the threads of the workpiece.

Figure 1:
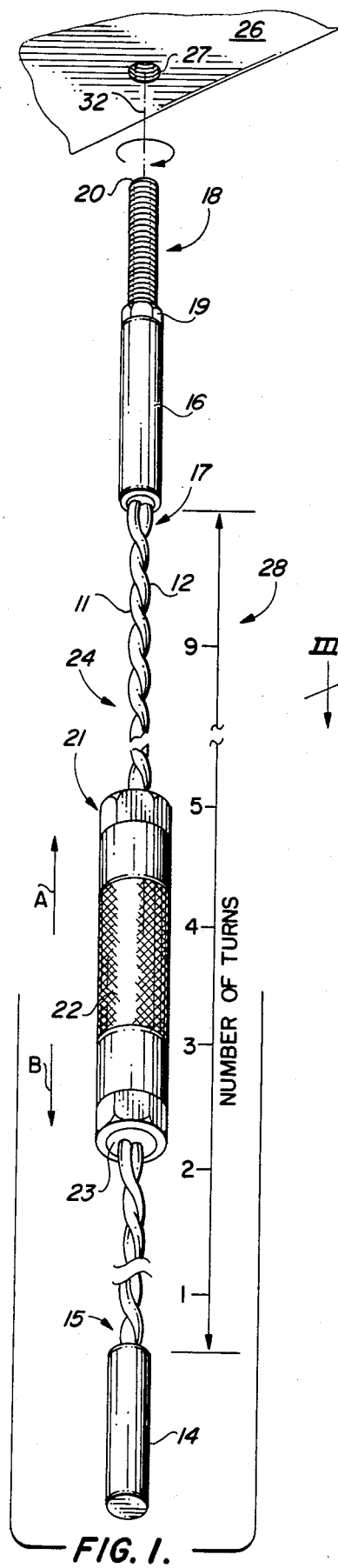
FIG. 1 is a front view of a thread gauge constructed in accordance with the principles of the invention and illustrating the mode of operation thereof.
Figure 2:
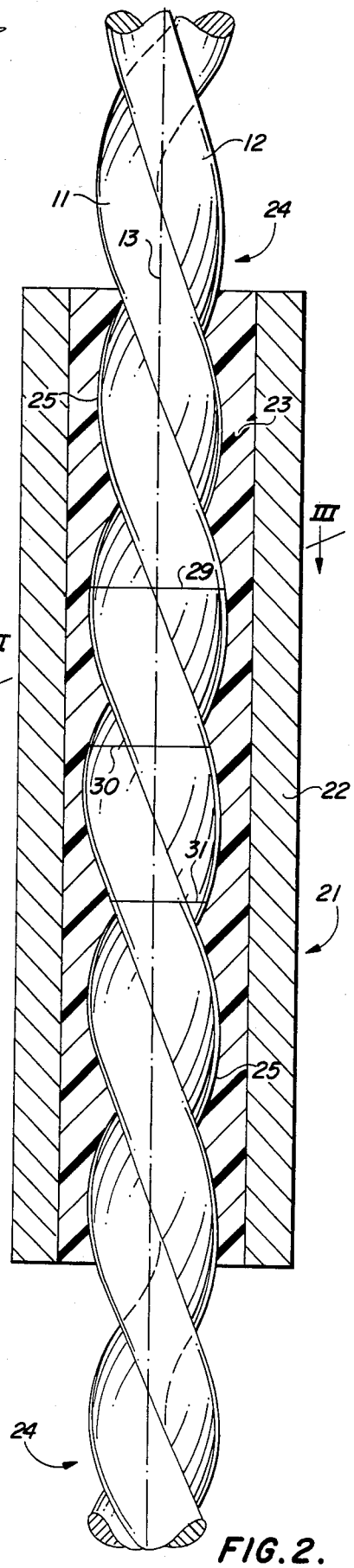
FIG. 2 is a section view of the drive member of the thread gauge of FIG. 1 further illustrating internal construction details thereof.
Figure 3:
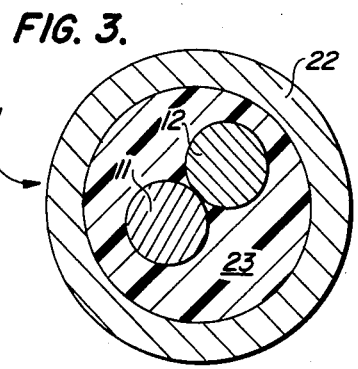
FIG. 3 is a section view of the drive member of FIG. 2 taken along section line III—III thereof.

Turning now to the drawings, in which the presently preferred embodiments of the invention are shown for the purpose of illustrating the practice thereof and not by way of limitation of the scope of the invention and in which like reference characters identify corresponding elements throughout the several views, the thread measuring tool of FIGS. 1 to 3 includes an elongate helical neck 24 formed by twisting a pair of wire strands 11, 12 about one another and about longitudinal axis 13. Cylindrical member 14 is connected to one end 15 of helical neck 24 while cylindrical member 16 is attached to the other end 17 of neck 24. Calibrated externally threaded gauge 18 is attached to member 16. In FIG. 1, gauge 18 is an externally threaded male gauge. Gauge 17 can, if desired, comprise a member having an internally threaded calibrated female bore. Gauge 18 can be a "go" or "no go" gauge. Presently, gauge 18 is attached to member 16 by forming an internally threaded bore in member 16. The bore has a longitudinal axis colinear with axis 13. One end of gauge 18 is threaded into the bore and nut 19 is threaded along gauge 18 and tightened against member 16 in the manner shown in FIG. 1 to secure gauge 18 in member 16. Gauge 18 includes tip 20. Hollow cylindrical housing 22 of drive member 21 encases cylindrical teflon member 23. Teflon member 23 is press fit onto helical neck 24. After member 23 is press fit on neck 24, the inner helical surface 25 of member 23 slidably conforms to the outer contact surfaces of helical neck 24. Workpiece 26 includes internally threaded bore 27 formed therein. As indicated by ruled line 28 in FIG. 1, the distance drive member 21 is displaced along neck 24 can be used to determine the number of turns of gauge 18 into a bore. Evenly spaced rules or marks 29-31 can be made on neck 24 to facilitate determination of the distance that member 22 has traveled along neck 24.

In operation, drive member 21 is positioned on neck 24 immediately adjacent and touching cylindrical member 14. Tip 20 of gauge 18 is positioned adjacent and contacting the mouth of bore 27 such that the longitudinal axis 13 of the thread measuring tool is generally colinear with the longitudinal axis 32 of bore 27. Housing 22 is grasped with the fingers of a hand and is displaced in the direction of arrow A along neck 24. When drive member 21 is displaced in the direction of arrow A, the fingers grasping member 21 generally prevent member 21 from rotating. Consequently, the linear non-rotational displacement of member 22 along helical neck 24 causes neck 24 and gauge 18 to rotate. If the threads in bore 27 are correctly formed, gauge 18 turns smoothly and snugly into bore 27. The number of turns of gauge 18 into bore 27 can be determined by measuring the distance drive member 21 has been displaced away from member 14 and along neck 24 in the direction of arrow A. Gauge 18 is removed from bore 27 by linearly non-rotationally displacing drive member 21 along neck 24 in the direction of arrow B.

Figure 4:
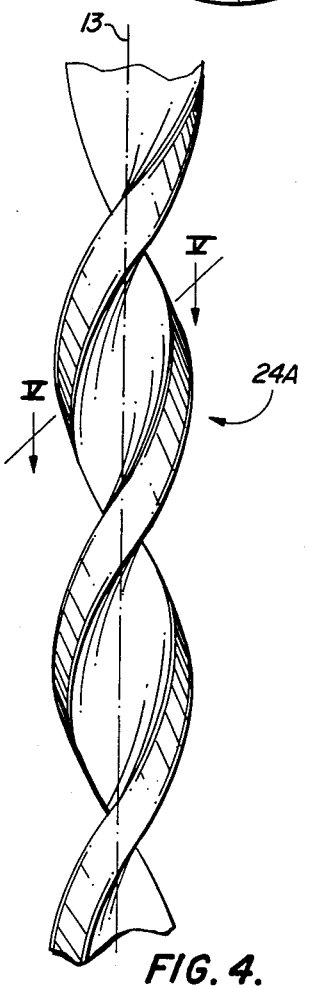
FIG. 4 is a front view of an alternate embodiment of the elongate helical neck of the thread gauge of FIGS. 1 to 3.
Figure 5:
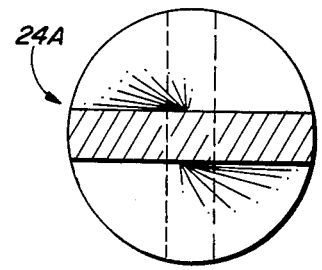
FIG. 5 is a section view of the helical neck of FIG. 4 taken along section line V—V thereof.

In FIGS. 4 and 5, helical neck 24A illustrates an alternate construction of neck 24. A teflon member 23 or a drive member formed out of another appropriate material can be press fit or otherwise formed to slidably contour to neck 24A.

Figure 6:
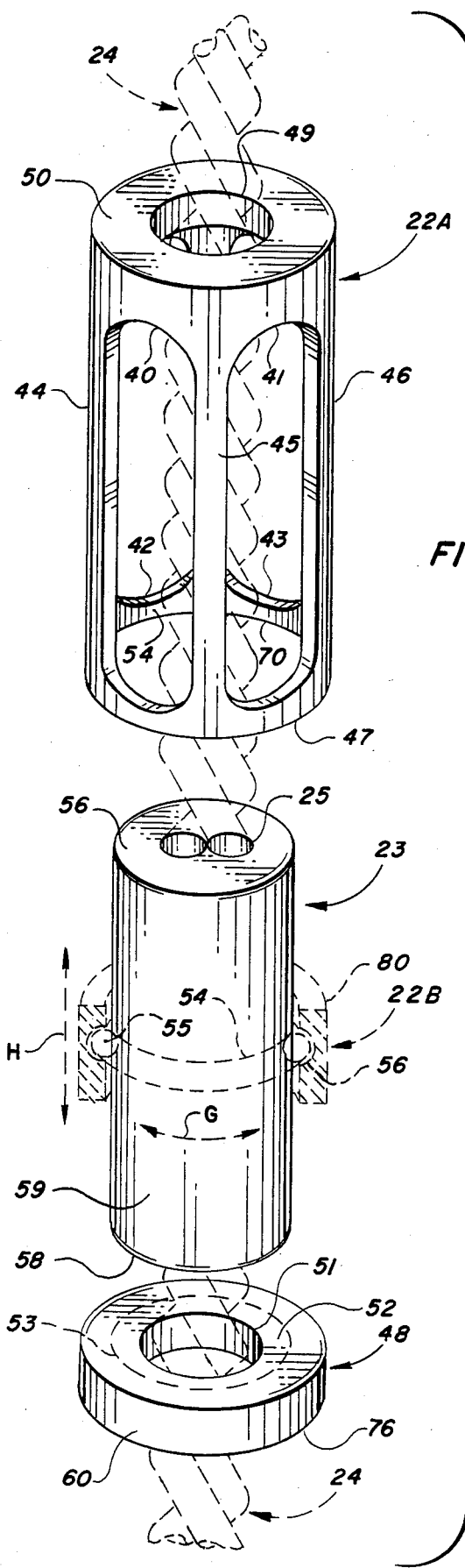
FIG. 6 is an exploded assembly view of an alternate drive member utilized in the apparatus of the invention.
Figure 7:
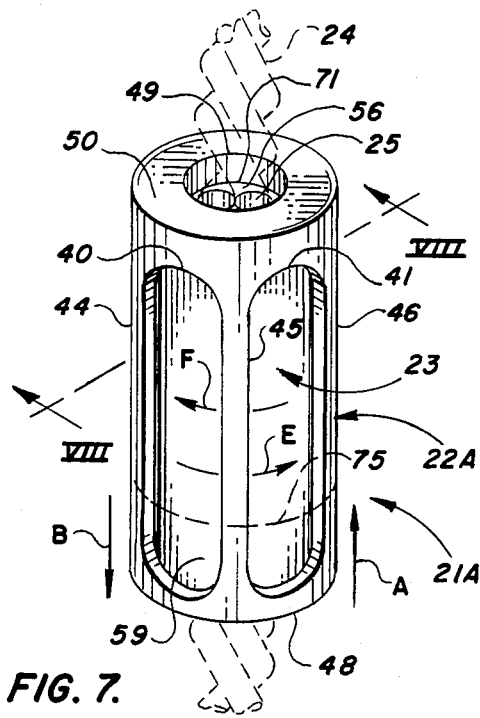
FIG. 7 is a perspective view of the drive member of FIG. 6 assembled for use in the apparatus of the invention; and, FIG. 8 is a front section view of the drive assembly of FIG. 7 taken along section VII—VIII thereof illustrating further construction details thereof.
Figure 8:
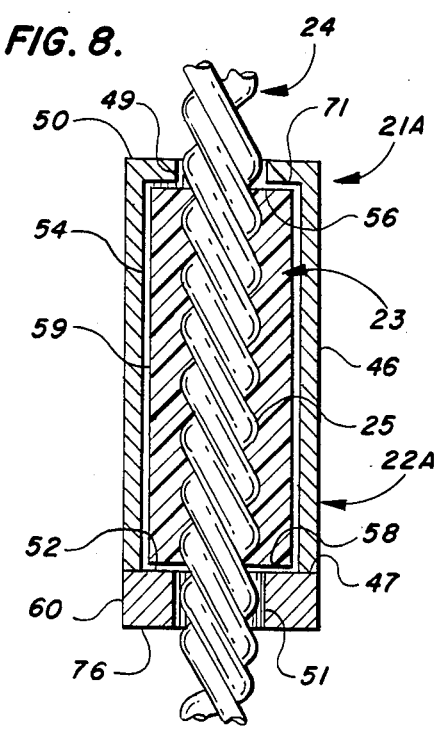

An alternate embodiment 21A of drive member 21 is illustrated in FIGS. 6 to 8 and includes, as does drive member 21, teflon member 23 press fit on neck 24. In member 21 housing 22 is fixedly secured to teflon member 23. In contrast, in drive member 21A housing 22A permits teflon member 23 to rotate within housing 22A while housing 22A is held between the thumb and forefinger and is linearly non-rotatably displaced along neck 24 in the direction of arrow A or B.

Housing 22A includes upper circular planar surface 50 and opening 49 formed therethrough. Inner planar circular surface 71 and lower planar circular surface 47 are parallel to and spaced apart from surface 50. Surface 47 circumscribes inner circular lip 70. Windows or elongate openings 40-43 formed in housing 22A extend from inner cylindrical surface 54 to the outer cylindrical surface of housing 22A. Vertically oriented rib 44 (in FIG. 6) separates windows 40 and 42; rib 45 separates windows 40 and 41; and, rib 46 separates windows 41 and 43. The rib separating windows 42 and 43 is parallel to ribs 44-46, but is not visible in the drawings. Each window 40-43 is equal in size to the other windows. Each rib passes through an imaginary circle, indicated by dashed line 75 in FIG. 6, which has a centerpoint intersected by the longitudinal axis 13 of neck 24. The plane of the circle 75 is perpendicular to axis 13. The point at which one rib intersects circle 75 is approximately 90 degrees from the point at which another adjacent rib intersects circle 75. For example, ribs 44 and 45 intersect circle 75 at points approximately 90 degrees apart. Ring 48 includes upper circular planar surface 52 which is parallel to and equal in size to lower circular planar surface 76. Circular aperture 51 extends through ring 48. The diameters of aperture 51 and opening 49 are equal. Outer cylindrical surface 60 is concentric with aperture 51. The portion of surface 52 intermediate dashed line 53 and surface 60 is fixedly connected to surface 47 of drive member 21A in the manner illustrated in FIGS. 7 and 8. Consequently, member 23 is rotatably retained inside housing 22A intermediate surfaces 52 and 71. The diameter of surface 59 of member 23 is slightly less than the diameter of inner cylindrical surface 54 and the shortest distance between surfaces 56 and 58 is slightly less than the shortest distance between surfaces 71 and 52 in FIG. 8. This permits housing 22A to be freely spun or rotated about axis 13 and member 23 when member 23 is stationary, and also permits member 23 to rotate inside housing 22A when housing 22A is not rotating. When member 23 is rotating about axis 15 and housing 22A is not rotating, surfaces 58, 56 and 59 slidably contact and move over surfaces 52, 71 and 54, respectively.

Operation of the embodiment of the invention shown in FIGS. 6 to 8 is now described with reference to FIG. 1. In use of the embodiment of the invention shown in FIGS. 6 to 8, while member 16 is grasped with one hand and prevented from rotating or moving, ring 48 is firmly grasped between the thumb and forefinger of the other hand and housing 22A and ring 48 are linearly non-rotatably displaced in the direction of arrow A or B. When housing 22A and ring 48 are linearly non-rotatably displaced in the direction of arrow A, member 23 also moves along neck 24 in the direction of arrow A. While member 23 moves along neck 24 in the direction of arrow A, member 23 rotates about axis 13 and rotates inside housing 22A in the direction of arrow E. If housing 22A is linearly non-rotatably displaced along neck 24 in the direction of arrow B, member 23 also moves along neck 24 in the direction of arrow B and rotates about axis 13 and rotates inside housing 22A in the direction of arrow F. When housing 22A and ring 48 are displaced along neck 24 in the direction of arrows A and B in the manner described above, housing 22A and ring 48 do not rotate because ring 48, which is fixedly attached to housing 22A, is firmly held between the thumb and forefinger of one hand. Once drive member 21A has been moved to the desired position along neck 24, tip 20 (See FIG. 1) of the gauge 18 (which is not visible in FIGS. 6 to 8) is positioned adjacent and contacting the mouth of bore 27 such that the longitudinal axis 13 of the thread measuring tool is generally colinear with the longitudinal axis 32 of bore 27. The user then releases member 16 from his grasp. Ring 48 is released from the grasp of the user and the thumb and forefinger which were grasping ring 48 are used to grasp member 23 through an opposing pair 40, 43 or 41, 42 of windows 40-43. In other words, member 23 is grasped and squeezed between the tips of a thumb and forefinger, the tips of the thumb and forefinger each being positioned in one of the opposing window pair. Grasping member 23 in this manner prevents it from rotating. When the hand grasping member 23 is used to force member 23 along neck 24 in the direction of arrow A (FIG. 1), the fingers grasping member 23, while preventing member 23 from rotating, also prevent housing 22A and ring 48 from rotating. As a result, the non-rotational linear displacement of member 23 along neck 24 causes neck 24 and gauge 18 to rotate. If the threads in bore 27 are correctly formed, gauge 18 turns smoothly and snugly into bore 27. The number of turns of gauge 18 into bore 27 can be determined by measuring the distance drive member 21 has been displaced along neck 24 while gauge 18 was turned into bore 27. The distance drive member 21 has been displaced along neck 24 can be determined utilizing a ruler or other measuring device in the manner indicated by line 28 in FIG. 1, or can be determined by using spaced apart rules or marks 29-31 made along the length of neck 24. Gauge 18 is removed from bore 27 by linearly non-rotatably displacing member 23 along neck 24 in the direction of arrow B to cause gauge 18 to rotate out of bore 27.

The advantage of drive member 21A is that it permits member 23 to be readily rotated along a stationary neck 24 in either direction A or B without housing 22A having to rotate simultaneously with member 23. In the embodiment of the invention shown in FIGS. 1 to 3, the member 23 and housing 22 are fixedly connected and must rotate simultaneously when drive member 21 is linearly displaced along a stationary neck in the direction of arrow A or arrow B.

Another housing which can be utilized with member 23 is indicated by dashed lines or ghost outline 22B in FIG. 6. Housing 22B is utilized in place of housing 22A and ring 48. Housing 22B is cylindrical, fully encircles member 23, and includes outer cylindrical surface 80 concentric with surface 59. In FIG. 6, only the ghost outline of the back half of housing 22B is shown for the sake of clarity. A U-shaped circular groove 54 is formed in surface 59 of member 23. Ball bearings 55 rotate in grove 54 and in opposing U-shaped circular groove 56 formed in housing 22B. Ball bearings 55 and grooves 54, 56 also prevent housing 22B from moving along member 23 in the directions indicated by arrows H. If surface 59 of member 23 is firmly held between then thumb and forefinger of a hand, rendering member 23 non-rotatable, then ball bearings 55 permit housing 22B to be readily rotated around member 23 in the directions of travel indicated by arrows G in FIG. 6. Similarly, if surface 80 of housing 22B is firmly held between the thumb and forefinger of a hand, rendering housing 22B non-rotatable, then member 23 can rotate inside cylindrical housing 22B when housing 22B is linearly, non-rotationally displaced along neck 24 in the direction of travel indicated by arrow A or by arrow B and member 23 rotates around neck 24 and simultaneously moves along neck 24 with housing 22B in the direction of arrow A or arrow B. When housing 22B is firmly held between the thumb and forefinger of a hand and the hand is used to linearly, non-rotatably displace housing 22B along a stationary neck 24, ball bearings 55, while permitting member 23 to rotate inside housing 22B, also transmit to member 23 a linear displacement force which causes member 23 to simultaneously move along neck 24 with housing 22B and to rotate inside housing 22B and about axis 13. As would be appreciated by those of skill in the art, to turn gauge 18 into bore 27, a drive member comprising only member 23 and housing 22B is operated in the manner earlier described for the drive member 21A. Drive member 21A comprises member 23, housing 22A and ring 48.

Having described by invention in such terms as to enable those skilled in the art to understand and practice it, and having identified the present preferred embodiments thereof, I claim:

1. A thread measuring tool comprising
   (a) an elongate helical neck having a longitudinal axis and a first end and a second end;
   (b) a threaded gauge attached to said first end of said neck;
   (c) a drive member slidably mounted on said neck and having an inner helical surface slidably contacting said neck and shaped and dimensioned such that linear non-rotational displacement of said drive member along said neck in a direction of travel generally parallel said longitudinal axis generates forces on said helical neck causing said neck and threaded gauge to rotate;
   (d) a housing mounted on said drive member and rotatable with respect to said drive member when said drive member is maintained in a stationary position, said housing, when linearly non-rotationally displaced in said direction of travel while said helical neck is stationary,
      (i) imparting a linear displacement force on said drive member in said direction of travel to cause said drive member to rotate about said helical neck and to rotate with respect to said housing, and
      (ii) simultaneously moving along said neck with said drive member in said direction of travel.

* * * * *